United States Patent
Iizuka et al.

(10) Patent No.: US 6,349,019 B1
(45) Date of Patent: Feb. 19, 2002

(54) MAGNETIC HEAD DEVICE WITH CONSTANT HEAD FLOATING HEIGHT

(75) Inventors: Toshihiro Iizuka; Yukihito Ito; Shoji Toyoda, all of Yamanashi-ken (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 08/286,224

(22) Filed: Aug. 5, 1994

Related U.S. Application Data

(63) Continuation of application No. 07/936,776, filed on Aug. 28, 1992, now abandoned.

(51) Int. Cl.$^7$ ................................................. G11B 5/55
(52) U.S. Cl. ..................................................... 360/264.1
(58) Field of Search ........................... 360/104, 97.01, 360/97.02, 103, 99.06

(56) References Cited

U.S. PATENT DOCUMENTS

| | | | | |
|---|---|---|---|---|
| 4,175,275 A | * | 11/1979 | Schaefer ..................... | 360/104 |
| 4,388,655 A | * | 6/1983 | Zenzefilis ................. | 360/97.01 |
| 4,819,100 A | * | 4/1989 | Asano ...................... | 360/97.01 |
| 4,860,137 A | * | 8/1989 | Shtipelman ................. | 360/104 |
| 4,926,275 A | * | 5/1990 | Kuno et al. ................. | 360/104 |
| 5,012,366 A | * | 4/1991 | Ohkita et al. ............... | 360/104 |
| 5,027,241 A | * | 6/1991 | Hatch et al. ................ | 360/104 |
| 5,285,338 A | * | 2/1994 | Sugahara et al. ........... | 360/105 |

FOREIGN PATENT DOCUMENTS

| | | | | |
|---|---|---|---|---|
| JP | 60205880 | * | 10/1985 | ................. 360/104 |
| JP | 4125871 | * | 4/1992 | ................. 360/104 |

* cited by examiner

*Primary Examiner*—Allen Cao
(74) *Attorney, Agent, or Firm*—Oblon, Spivak, McClelland, Maier & Neustadt, P.C.

(57) ABSTRACT

This invention provides a magnetic head device to be incorporated in a hard disc drive device which can minimize the fluctuations in the height of a floating head slider between the outer periphery and inner periphery of a magnetic disc and which has stable floating characteristics over the whole recording area thereof. The magnetic head device includes a head arm which is attached within a hard disc drive device in a rotatable/swingable manner and a head slider fixed on an end of a suspension member extending from the head arm, wherein the distance between the rotational center of the head arm to the center of the head slider and the position of the center of the rotation of the head arm are so determined to satisfy the relation, $$-0.1 \leq (D-L) \leq 0.6\ W - 4.4$$

when the distance between the rotational center of the head arm and the center of a magnetic disc is given as D, the distance from the rotational center of the head arm to the center of the head slider as L, and the width of the recording area on radius of the magnetic disc as W.

6 Claims, 3 Drawing Sheets

MAGNETIC HEAD DEVICE WITH CONSTANT HEAD FLOATING HEIGHT

This application is a Continuation of application Ser. No. 07/936,776 filed on Aug. 28, 1992 now abandoned.

BACKGROUND OF THE INVENTION

1. Field of the Invention

This invention relates to a magnetic head device to be incorporated in a hard disc drive which is an external memory device for computers, and more particularly, to a magnetic head device with a constant head floating height which is structured to make the amount of floating of a head slider raised from a hard magnetic disc, when driven, substantially constant over the whole area of the memory/reproducing region of the disc.

2. Discussion of the Background

In a hard disc drive device for recording/reproducing digital information by means of a magnetic disc of a rigid material, a slider of a magnetic head is held at the tip end of a suspension means (a load beam) extending from a head arm, the base of said arm is fixed on a swinging shaft (an arm drive shaft) near the outer periphery of the magnetic disc, and the magnetic head at the tip end of the suspension means is rotated substantially radially about the said arm drive shaft which is used as a fulcrum so as to perform seeking of the recording track on the disc. During recording/reproducing, the head slider slightly floats over said magnetic disc by air pressure generated between an air bearing surface of the magnetic head opposing the disc and the rotating disc. As fluctuation in floating height affects recording/reproducing characteristics during operation, it is necessary to make the height of floating constant over the whole area that the head slider seeks in order to obtain excellent characteristics. There have been proposed in the prior art various methods to make the floating height constant. For example, the related art shows a load applied on the slider to press the magnetic disc by means of the suspension means. Another related device sets the area, particularly the width, of the air bearing surface smaller in the direction perpendicular to the direction of disc traveling.

The peripheral speed of a magnetic disc of a hard disc drive device, when rotated, is generally higher on the outer periphery than the inner periphery, and therefore, the air pressure between the air bearing surface of said head slider and said magnetic disc is higher at the outer periphery. As the speed of rotation of such magnetic discs has increased in recent years, fluctuations in the height of the floating head slider in the radial direction of the disc cannot be controlled by merely applying a larger load on the head slider or setting a smaller width for the air bearing surface. Especially, with the recent increase in the packing density, head sliders are required to have lower floating height, and even a minute fluctuation of floating height affects the characteristics. It has become increasingly difficult to maintain a constant height of floating in the scope necessary for excellent characteristics merely by increasing the load of the head slider or reducing the area of the air bearing surface without taking into considerations the difference in peripheral speed between the outer and inner peripheries of the magnetic disc.

SUMMARY OF THE INVENTION

Accordingly, an object of this invention is to provide a hard disc drive device which can minimize the difference in the floating heights of a head slider between the outer and inner peripheries of a magnetic disc, and stably retain a constant height from the disc over the whole recording/reproducing area in the radial direction of the magnetic disc so as to realize operation of the head slider with the minimum height of the floating, and especially to provide a magnetic head device with constant head floating height which is to be incorporated in said drive device.

This invention provides a magnetic head device with constant head floating height wherein a head slider having an air bearing surface extending along the longitudinal direction of a head arm is fixed on an end of a suspension means (a load beam) extending from the head arm, and the distance between the rotational center of said head arm and the center of said slider and the position of the rotational center of the head arm are set to satisfy the following relation:

$$0 \leq (D-L)\text{mm} \leq (0.6\ W - 4.4)\text{mm}$$

wherein the distance from the rotational center of said head arm to the center of the magnetic disc is expressed as D (mm), the distance from the rotational center of said head arm to the center of said head slider as L (mm), and the radial width of the recording area of said magnetic disc as W (mm).

In the magnetic head device with the structure according to this invention, the difference between the length from the head arm to the suspension means and the length from the rotational center of the arm to the center of the magnetic disc is set to satisfy the relation as expressed above, so that the longitudinal direction of the air bearing surface of the head slider may gradually approximate the tangent of the recording track of the magnetic disc as the head slider moves from the outermost periphery to the innermost periphery of the disc. Therefore, the air pressure between the air bearing surface of the head slider and the magnetic disc would not become too large on the side of the outermost periphery of the disc where the peripheral speed is maximum, or too small on the side of the innermost periphery thereof where the speed is minimum. As a result, fluctuations in the floating height of the magnetic head between the inner and outer peripheries of the magnetic disc become almost null, and stable floating can be secured. When this device was tested on magnetic discs of various sizes, it was confirmed that the difference between the maximum height and the minimum height was less than 1 μin over the whole recording area. As the floating is made constant, the characteristics are stabilized. Moreover, a magnetic head device with minimum head floating height is realized.

DESCRIPTION OF THE PREFERRED EMBODIMENTS

The foregoing and other objects, features and advantages of the invention will be apparent from the following more particular description of the preferred embodiments of the invention illustrated in the drawings, wherein.

Figure 3A:
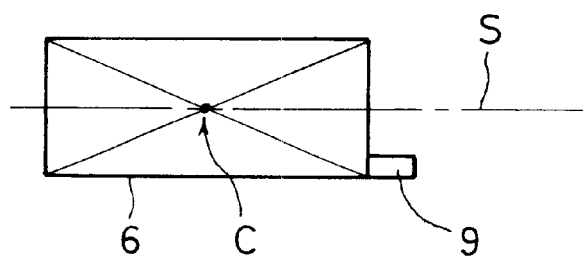
Figure 3B:
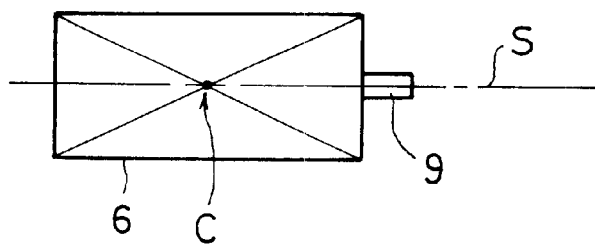
Figure 4:
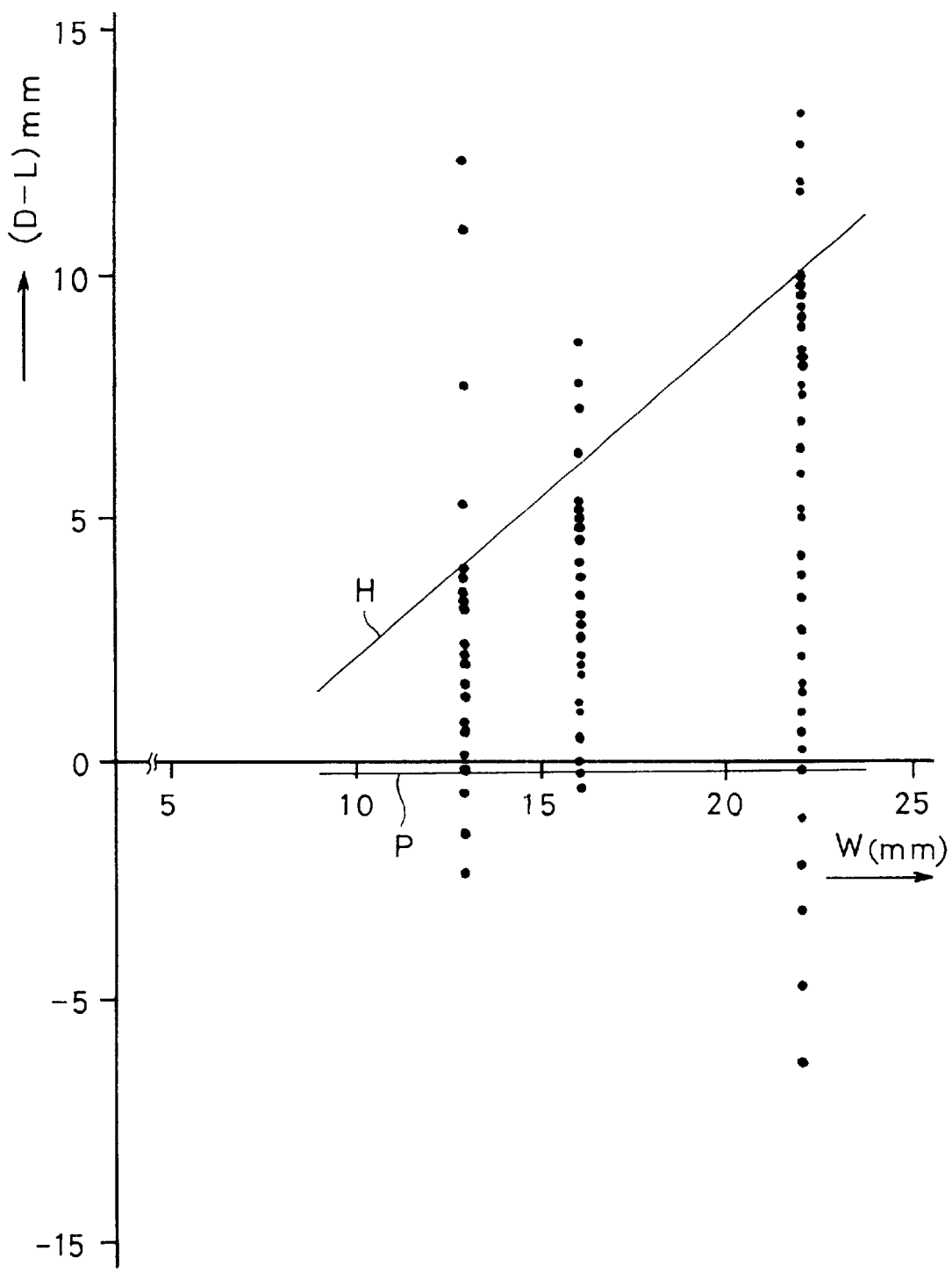

FIGS. 3A and 3B are plan views to show the central positions of different head sliders respectively according to this invention; and FIG. 4 is a graph knowing the relation between the width W of the recording area on the radius of magnetic discs of different sizes and the difference (D–L) in the distance between the rotational center of the arm and the center of the disc and between the rotational center thereof and the center of the slider, when the height of the slider floated from the magnetic disc is 0.05 μm.

Figure 1:
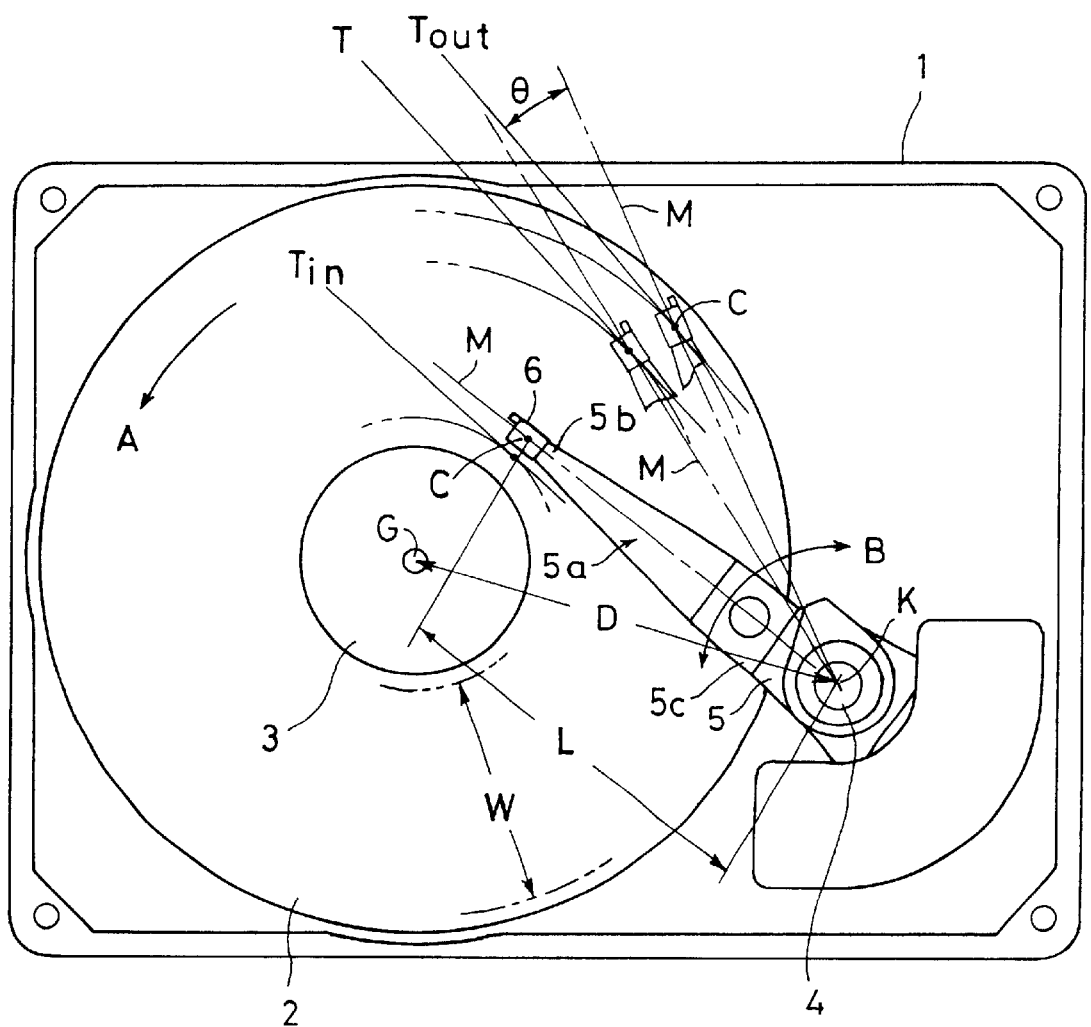
FIG. 1 is a plan view to show a hard disc drive device incorporating an embodiment of this invention magnetic head device with constant head floating height when the lid is removed.
Figure 2:
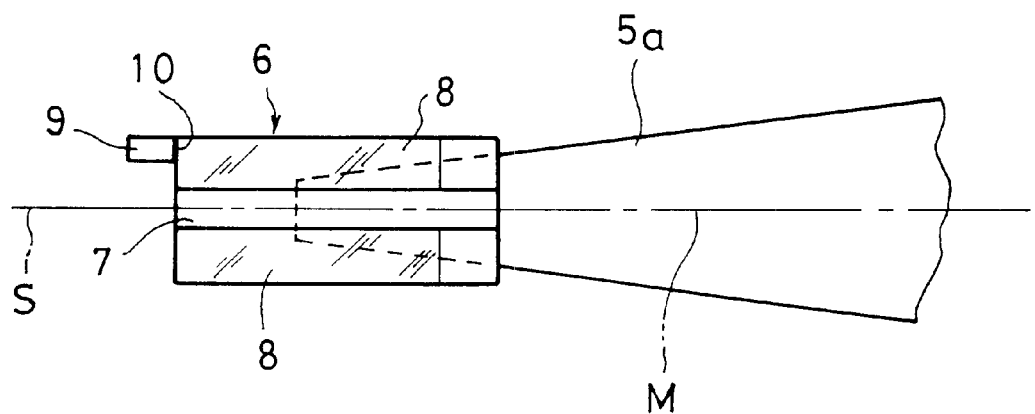
FIG. 2 is a bottom view to show the head slider applicable to the magnetic head according to this invention, when seen from the side of the air bearing surface thereof.

Referring now to FIG. 1, a disc spindle 3 is journaled in a casing 1 of a hard disc drive device, the spindle 3 being mounted axially at an interval with a plurality of magnetic hard discs 2 which are the recording media. A driving shaft 4 for swinging and rotating an arm is provided at a corner of the casing near the outer periphery of the magnetic disc 2 and a head arm 5 for the magnetic head with constant head floating height according to this invention is journaled at the base end thereof on said shaft 4. A suspension means (a load beam) 5a is attached via a mount 5c to the forward end of the head arm 5 in a manner to extend over and along the recording surface of the magnetic disc 2. A head slider 6 of the magnetic head is fixed at the tip end 5b of said suspension means 5a. The head slider 6 is fixed to the tip end 5b of the suspension means 5a via a spring plate which is generally known by the name of flexure (not shown). As shown in FIG. 2, on the surface of the head slider 6 which opposes a disc are formed a recessed groove 7 and a pair of rail-like air bearing surfaces 8, which extend in the longitudinal direction of the suspension means 5a.

In this structure, when the disc spindle 3 is driven to rotate, the magnetic disc 2 is rotated with the spindle 3 in the direction marked with the arrow A in FIG. 1, and the head slider 6 is slightly floated from the disc 2 by the air current generated by the rotation of the disc 2, resisting against the spring force applied on the slider 6 by the suspension means 5a. The head arm 5 together with the suspension means 5a swings (in the direction of the arrow B in FIG. 1) about the fulcrum of the driving shaft 4 within a predetermined scope of angle when the shaft 4 is rotated in a manner to make the magnetic head at the end of the suspension means 5b to seek the recording area of the magnetic disc 2 from the outermost side toward the innermost side (width W) transversely the recording track which is formed concentrically on the recording surface.

As generally shown in FIG. 2, a magnetic gap 10 perpendicular to the recording track is formed by a core piece 9 which projects from the rear end of the rectangular parallelepiped head slider 6 located down-stream the magnetic disc in its traveling direction. Recording/reproducing of information on the track of the magnetic disc is made with the magnetic gap 10. As shown in FIG. 3A or 3B, the core piece 9 may be formed at one side of the rear end of the head slider 6 (FIG. 3A) or at the center of the rear end thereof (FIG. 3B). In case the core piece 9 is situated at the center of the rear end as shown in FIG. 3B, there will be formed three of the rail-like surfaces of the slider 6 in the direction of said head arm. In either cases, the intersection point of two diagonal lines of the rectangular surface of the head slider 6 opposing the disc determines the center of the slider C.

The inventors of this application tested and confirmed that the height of the head slider 6 can be made constant over the whole area of recording/reproducing of the magnetic disc 2 simply by controlling the air pressure which acts on the surface of the head slider 6 to be smaller on the outer periphery of the disc 2 and larger on the inner periphery thereof when the head arm 5 and hence the suspension means 5a fixed on the arm 5 are swinging between the outermost side and the innermost side of the magnetic disc 2 for seeking and for recording/reproducing. For this purpose, the center line S of the slider 6 in the longitudinal direction is preferably oriented in the tangential direction of the recording track at the center point of the slider closer on the inner peripheral side rather than on the outer side. When the relation among the distance L (mm) between the fulcrum K of the head arm 5 and the center C of the slider, the distance D (mm) between the driving fulcrum K of the head arm 5 and the disc spindle 3, and the height of the head slider 6 floating from the disc 2 was studied using magnetic discs 2 of various sizes, and the following result was obtained.

FIG. 4 is a graph in which values (D–L)mm are plotted to detect the position of all the tracks within the scope of Wmm for magnetic discs of various sizes. In the graph of FIG. 4, the horizontal axis W (mm) represents the width of the recording area on radius of magnetic discs of various sizes (see FIG. 1). For instance, in the case of a 3.5 inch magnetic disc (about 22.5 mm wide in the radius of the recording area), the difference (absolute value) in the floating height between the outer and inner peripheries of the head slider stays at 0.05 μm or less when the value (D–L)mm is in the range of –0.1~10.0 mm. When the value (D–L)mm is set at other values than the above, the floating height will often exceed 0.05 μm. In the case of 2.5 inch magnetic discs (about 16 mm wide on the radius of the recording area), the height difference remains at 0.05 μm or less in many cases when the relation holds as 0.15 mm≦(D–L)mm≦5.8 mm. When magnetic discs of various sizes were studied, it was found that the scope of the value (D–L)mm which satisfies the requirement of the height difference of 0.05 μm or less can be defined, given (D–L)=y, by two straight lines, i.e. y=0.656 W–4.44 (the straight line H in FIG. 4) and y=–0.2 (the straight line P in FIG. 4). As the above mentioned relation is an experimental relation obtained from actual magnetic disc measurements, deviation more or less from it may be permitted.

Based on the result of aforementioned experiments, it was found that this invention can realize a magnetic head device which has stable floating with less fluctuation over the whole recording region of a magnetic disc irrespective of the difference in the peripheral speed between the outer and the inner peripheries of such magnetic disc simply by so setting the distance L between the rotational center of the head arm 5 and the center C of the head slider 6 and the position of the rotational center of the head arm 5 (the position of the fulcrum of the arm drive) that the relation, –0.1≦(D–L)≦0.6 W–4.4 (in mm) can be satisfied for a given size of magnetic disc.

If the value (D–L) stays within the scope mentioned above, the head slider 6 moves over the disc 2 for seeking operation in a manner to be described below referring to FIG. 1. The center line S (FIG. 2) which passes the center C of the head slider 6 in the longitudinal direction (the longitudinal direction of the rail-like air bearing surface) substantially coincides with the axial line M of the suspension means 5a and the head arm 5. When the head arm 5 swings outward on the magnetic disc 2 to position the slider 6 at the recording track on the outermost periphery of the disc, the axial line M of the head arm 5 in the longitudinal direction intersects the tangent $T_{out}$ of the recording track at the center C of the slider 6 at the maximum angle θ and gradually approximates the tangent T as the head arm 5 swings back toward the center of the magnetic disc 2. When the head slider 6 is positioned at the recording track on the innermost periphery of the magnetic disc 2, the axial line M of the head arm 5 substantially approximates the tangent line $T_{in}$ of the track at the center of the slider C. This means that due to the rotation of the disc 2, the air bearing surface of the head slider 6 apparently becomes smaller on the outer periphery and larger on the inner periphery of the disc 2. As explained in the foregoing, simply by determining the length of the head arm 5 and the suspension means 5a as relative to the center position G of the disc spindle 3 and position of the arm drive fulcrum K so that the value (D–L) will fall within the above mentioned scope, large air pressure is prevented from being generated between the slider 6 and the magnetic disc 2 on the outer periphery and the floating of the head slider 6 can be maintained at a constant height over the whole area of recording from the outermost to the innermost peripheries of the magnetic disc 2. In this invention, the position of mounting the core piece 9 of the magnetic head is by no means limited to those shown in FIG. 3A or 3B. Moreover, the structure of the magnetic gap according to this invention is applicable, for instance, to a thin film type head, a monolithic head, a composite head or any other type of magnetic head. It is obvious that all those are included in the scope of this invention which is specified by the claims.

What is claimed is:

1. A magnetic head device with constant head floating height including a head arm attached to a drive shaft of a hard disc drive device, a suspension means extending from said head arm, and a head slider fixed on the tip end of said suspension means having an air bearing surface extending along said head arm in the longitudinal direction thereof, wherein the distance from the fulcrum for rotating/driving said head arm to the center of a magnetic disc D (mm), the distance from the fulcrum of said head arm to the center of said head slider L (mm), and the radial width of the recording area of said magnetic disc W (mm), the distance from the rotating/driving fulcrum of said head arm to the center of the slider is so set to satisfy the relation:

$$0 \leq (D-L)mm \leq (0.6\ W-4.4)mm$$

wherein, the radial width W of said magnetic disc is between 12.5 mm and 22.5 mm, the core piece is positioned so as to be maintained at a constant floating height over all area of the rotating disc when performing a reading/writing operation.

2. A magnetic head device of claim 1, wherein the air bearing surface of the magnetic head is aligned with a tangential direction of a recording track on an inner periphery of the magnetic disc.

3. A magnetic head device incorporated in a computer disc drive, which supports a rotating computer disc of any size having a radial width W of the recording area and having a center point, comprising:

a fulcrum rigidly attached to the disc drive, and having a center point which is at a distance D from the disc's center point;

a straight arm having a first end pivotally attached to the fulcrum and a second end extendable over different areas of the disc including an inner-periphery and outer-periphery;

a core piece positioned on a portion of the arm which is extendable over the disc, for reading and writing data encoded on the disc as the arm pivots;

a slider positioned at the second end of the arm and having a center point at a distance L from the fulcrum's center point, and is supported by pressurized air which forms over a surface of the rotating disc, and for suspending the arm and core piece over the rotating disc, the distances D and L satisfying the equation:

$$0.0 \leq (D-L) \leq (0.6\ W-4.4)mm$$

wherein, the radial width W of said magnetic disc is between 12.5 mm and 22.5 mm, the core piece is positioned so as to be maintained at a constant floating height over all area of the rotating disc when performing a reading/writing operation.

4. A magnetic head device according to claim 3, wherein the constant height at which the core piece is maintained above the rotating disc is between 0.0 $\mu$m and 0.05 $\mu$m.

5. A magnetic head device according to claim 3, wherein the rotating disc is a 3.5 inch disc, W is approximately 22.5 mm, and (D–L) mm is between 0.0 mm and 10.0 mm.

6. A magnetic head device according to claim 3, wherein the rotating disc is a 2.5 inch disc, W is approximately 16 mm, and (D–L) mm is between 0.15 mm and 5.8 mm.

* * * * *

UNITED STATES PATENT AND TRADEMARK OFFICE
CERTIFICATE OF CORRECTION

PATENT NO.   : 6,349,019 B1
DATED        : February 19, 2002
INVENTOR(S)  : Iizuka et al.

It is certified that error appears in the above-identified patent and that said Letters Patent is hereby corrected as shown below:

Title page,
Item [30], Foreign Application Priority Data, should read:
-- [30]     Foreign Application Priority Data
        May 28, 1992   (JP) ........................... 4-162269 --

Signed and Sealed this

Sixth Day of July, 2004

JON W. DUDAS
*Acting Director of the United States Patent and Trademark Office*